United States Patent [19]

Higashi et al.

[11] Patent Number: 5,021,824
[45] Date of Patent: Jun. 4, 1991

[54] RECORDING APPARATUS HAVING A DETACHABLE RECORDING MATERIAL STORING UNIT

[75] Inventors: Masato Higashi; Sadanobu Murasaki, both of Osaka, Japan

[73] Assignee: Minolta Camera Kabushiki Kaisha, Osaka, Japan

[21] Appl. No.: 476,830

[22] Filed: Feb. 7, 1990

[30] Foreign Application Priority Data

Feb. 8, 1989 [JP] Japan .................................. 1-29468
Feb. 8, 1989 [JP] Japan .................................. 1-29469

[51] Int. Cl.⁵ .............................................. G03B 27/58
[52] U.S. Cl. .................................... 355/72; 352/73; 352/74; 352/172
[58] Field of Search ................... 352/73, 74, 172; 355/72

[56] References Cited

U.S. PATENT DOCUMENTS

| | | | |
|---|---|---|---|
| 3,463,580 | 8/1969 | Freudenschusz | 352/73 |
| 3,675,876 | 7/1972 | Frederick | 352/74 |
| 3,722,828 | 3/1973 | Kremp et al. | 352/74 |
| 4,134,649 | 1/1979 | Suzuki et al. | 352/172 |
| 4,174,888 | 11/1979 | Hunn et al. | 352/172 |
| 4,566,785 | 1/1986 | Takenouchi | 355/72 |
| 4,621,272 | 11/1986 | Toriumi et al. | 346/134 |
| 4,748,795 | 5/1988 | Ohira et al. | 355/72 |
| 4,785,321 | 11/1988 | Muraskaki | 354/321 |
| 4,806,978 | 2/1989 | Nakatani et al. | 355/14 R |
| 4,826,102 | 5/1989 | Kato et al. | 242/192 |
| 4,864,362 | 9/1989 | Hayashi et al. | 355/72 |

*Primary Examiner*—Monroe H. Hayes
*Attorney, Agent, or Firm*—Willian Brinks Olds Hofer Gilson & Lione

[57] ABSTRACT

A recording apparatus comprising a magazine for storing a recording material, and a sensor for detecting a quantity of the recording material stored in the magazine. The magazine is movable between an inward position for supplying the recording material to a recording station and a position protruding from the apparatus body. A magazine moving device is provided which, in response to the sensor, moves the magazine from the inward position to the position protruding from the apparatus body.

11 Claims, 19 Drawing Sheets

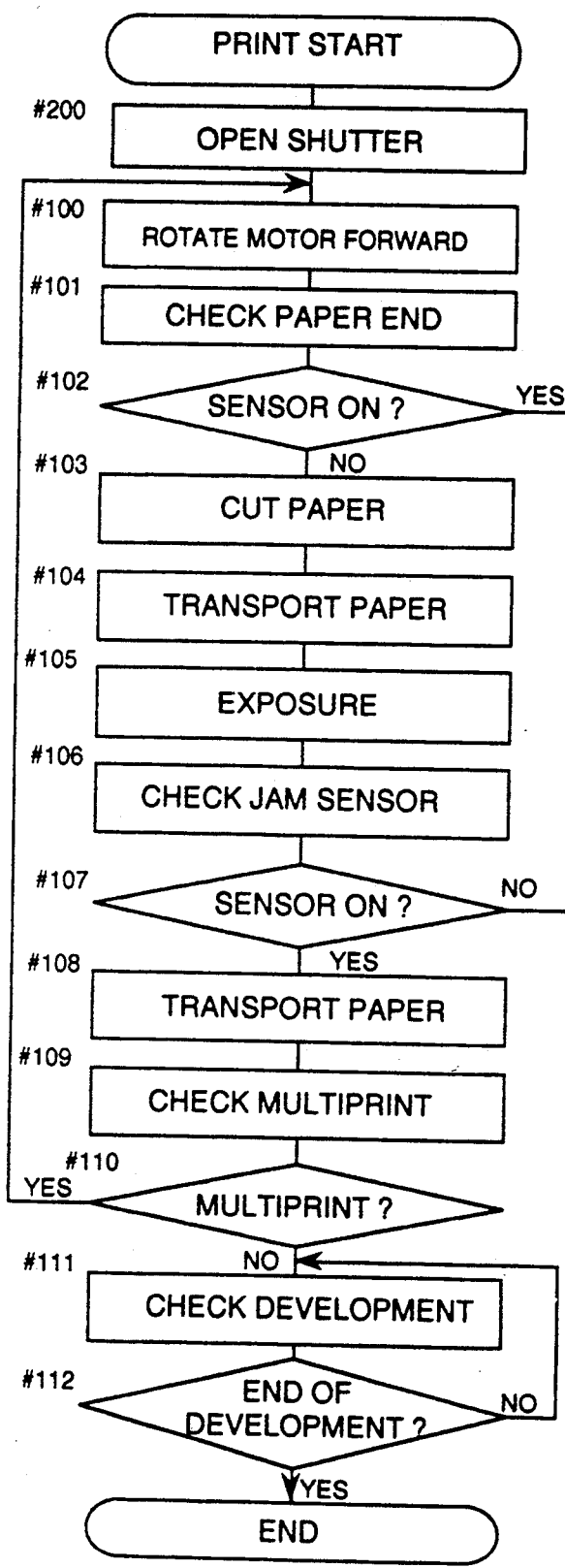
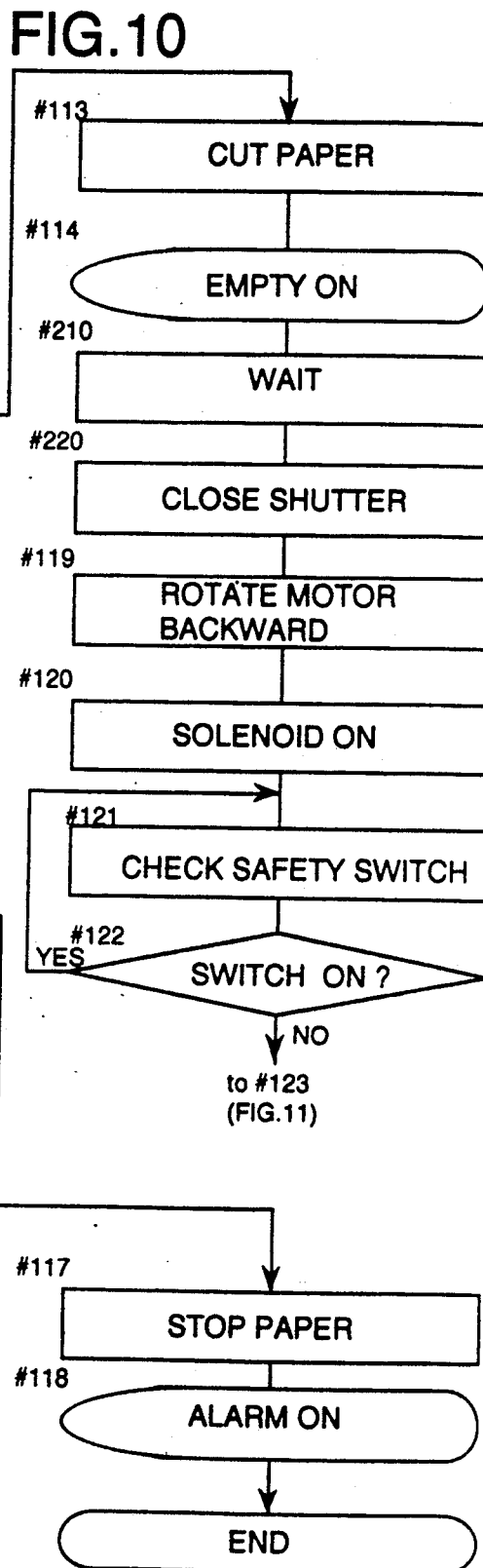
FIG.10

RECORDING APPARATUS HAVING A DETACHABLE RECORDING MATERIAL STORING UNIT

BACKGROUND OF THE INVENTION

1. Field of the Invention

The present invention relates to a recording apparatus for recording information on a recording material, and more particularly to a recording apparatus having a detachable unit for storing the recording material.

2. Description of the Prior Art

Laser printers, thermal printers and the like are known which record information on a recording material such as a silver salt film, photosensitive paper or ordinary paper. In such a recording apparatus, it is desirable for the recording material to be supplied continuously until recording is completed when recording a series of information spanning several pages, for example. When recording a large amount of information in particular, it is desirable for the recording material to be supplied without an interruption for the sake of high recording efficiency.

Generally, the recording material is stored in a container called a unit, magazine or cassette to be made available in a predetermined position inside an apparatus body. The recording material is supplied from the container to an information recording station in the apparatus body for recording information thereon. Normally, the recording material container is detachably mounted in the apparatus body to facilitate replenishment of the recording material. Thus, the recording material is replenished by removing the container from the apparatus body and placing a fresh supply of the recording material in the container. To carry out the replenishment of the recording material efficiently, it is necessary for the operator to constantly monitor the remaining quantity of recording material during the operation of the recording apparatus.

U.S. Pat. No. 4,748,479 discloses an electrophotographic copying machine which displays a quantity of paper remaining in a paper storage. With this copying machine, however, the remaining quantity of paper is displayed on its control panel, which entails the disadvantage that the operator can grasp the remaining quantity of paper only when he or she is close to the copying machine.

SUMMARY OF THE INVENTION

A primary object of the present invention, therefore, is to provide a recording apparatus which allows the remaining quantity of recording material to be grasped at a position remote from the apparatus.

Another object of the invention is to provide a recording apparatus which includes a detachable unit for storing a recording material, and automatically ejects the unit when the recording material is exhausted.

The above objects are fulfilled, according to the present invention, by a recording apparatus for recording information on a recording material, comprising an apparatus body including a recording station; storing means for storing the recording material therein, the storing means being movable between a first position for supplying the recording material to the recording station and a second position protruding from the apparatus body; detecting means for detecting a quantity of the recording material stored in the storing means; and means responsive to the detecting means for moving the storing means from the first position to the second position.

According to this construction, when a desired quantity of the recording material is dispensed from the storing means, the storing means is moved to a position protruding from the apparatus body.

Thus, the operator is allowed to visually recognize the storing means protruding from the recording apparatus. This is possible with little influence of the distance and positional relationship between the recording apparatus and the operator, including the case of the operator being remote from the apparatus.

As a result, the operator positively becomes aware of the timing for replenishing the recording material.

The need for replenishing the recording material is automatically notified, which facilitates control of the recording apparatus and realizes a very high operating efficiency.

In a further aspect of the invention, a recording material supply device is provided for supplying a recording material to a recording apparatus which records information on the recording material. This device comprises a casing; a plurality of storing units for storing the recording material therein, each storing unit being detachably provided in the casing; selecting means for selecting storing units to be used from the plurality of storing units; supplying means for supplying the recording material from each storing unit to the recording apparatus; detecting means for detecting a quantity of the recording material stored in each storing unit; control means for controlling the supplying means so that the recording material is supplied from one of the selected storing units until the detecting means detects exhaustion of the recording material stored in the one of the selected storing units, and that the recording material is supplied from another selected storing unit after the detecting means detects exhaustion of the recording material stored in the one of the selected storing units; and means responsive to the detecting means for causing the one of the selected storing units to protrude from the casing after the detecting means detects exhaustion of the recording material stored in the one of the selected storing units.

According to this construction, when a desired quantity of the recording material has been drawn out of one of the storing units, this storing unit is moved to the position protruding from the recording apparatus. At the same time, the supplying means causes the recording material to be supplied from the selected storing units excluding the unit protruding from the apparatus. These operations are automatically effected by the control means.

Thus, the operator is allowed to visually recognize which storing unit is protruding from the recording apparatus. This is possible with little influence of the distance and positional relationship between the recording apparatus and the operator, including the case of the operator being remote from the apparatus.

As a result, the operator can immediately recognize which storing unit is empty, for replenishing the recording material readily and with excellent timing. This promotes operability and recording efficiency of the recording apparatus.

In addition, when one storing unit becomes empty, the recording material is automatically supplied from another storing unit. This allows the recording material to be replenished while a recording operation is in progress. Since there is no need to interrupt the recording operation, the recording apparatus has an improved throughput.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

1. First Embodiment

Figure 1:
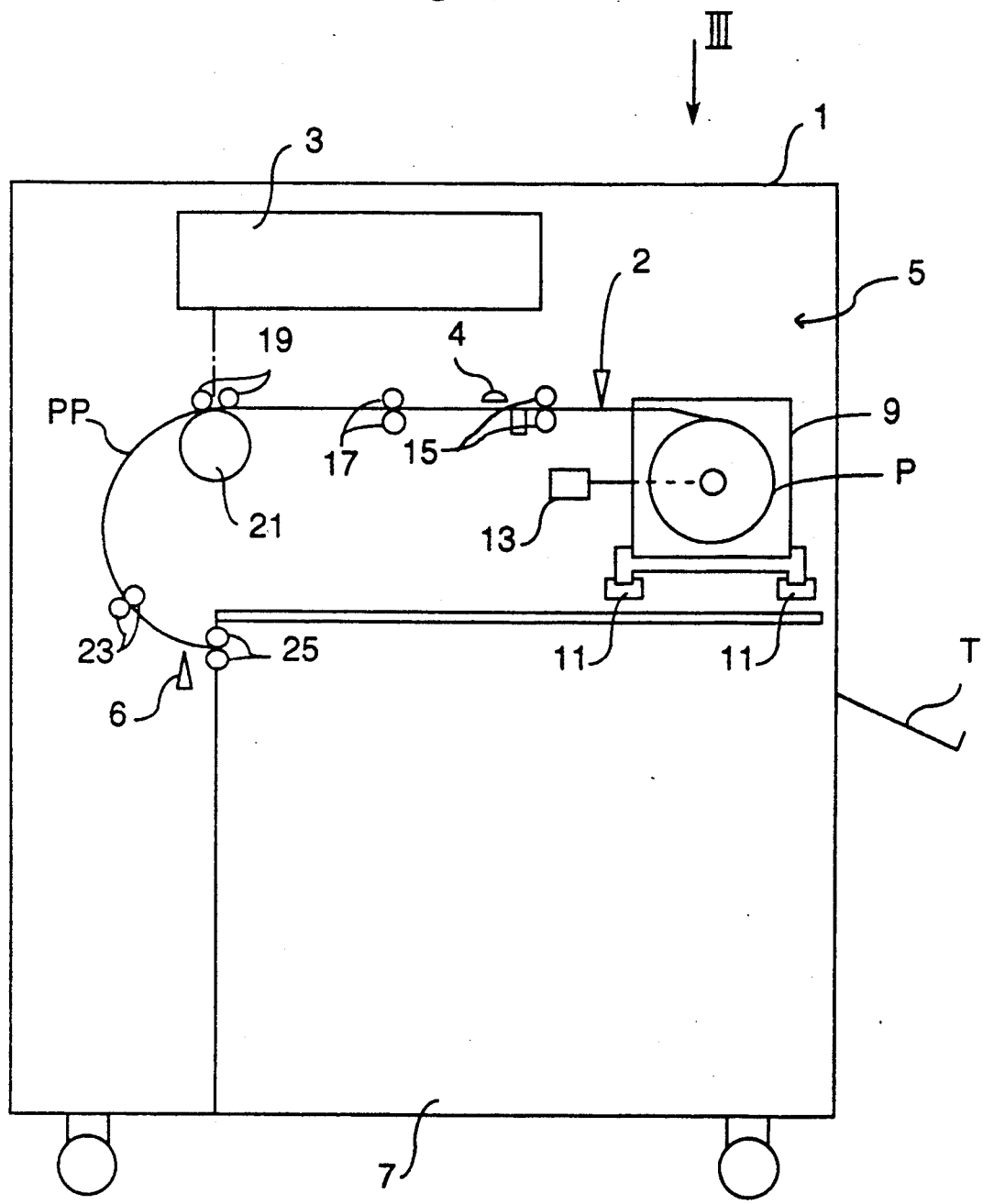
FIG. 1 is a schematic view of a laser printer forming a first embodiment of the present invention.

FIG. 1 schematically shows a laser printer 1 having a recording material supplying device, which is one example of recording apparatus forming a first embodiment of the present invention.

The recording material supplying device in this embodiment is in the form of a paper feed mechanism 5 that supplies the laser printer 1 with a rolled recording material (roll paper P) formed of a photosensitive material such as a silver salt film.

The laser printer 1 comprises, as main components thereof, a laser optical system 3 for emitting a laser beam, the paper feed mechanism 5 for supplying the roll paper P to the laser optical system 3, and a developer 7 for developing the paper P exposed to the laser beam.

A tray T is provided forwardly of the developer 7 for receiving the developed paper P.

The paper feed mechanism 5 includes, as main components thereof, a pair of guide rails 11 for supporting a magazine 9 (storage) which interchangeably stores the roll paper P, a roll drive motor 13 rotatable in opposite directions and acting as a drive source for dispensing and taking up the roll paper P, and feed rollers 15 for transporting the roll paper P.

An end sensor 2 (detecting device) is disposed upstream of the feed rollers 15 along a transport path of the roll paper P for detecting the whole (or a predetermined quantity) of the roll paper P drawn out of the magazine 9. Downstream of the feed rollers 15 is a cutter 4 for cutting the roll paper P.

The transport path of the paper P from the feed rollers 15 downstream to the developer 7 includes guide rollers 17 and 19, a transport roller 21, and guide rollers 23 and 25. A jam sensor 6 such as an ultrasonic sensor is disposed immediately upstream of the guide rollers 25 for detecting entry of the paper P to the developer 7.

Figure 2:
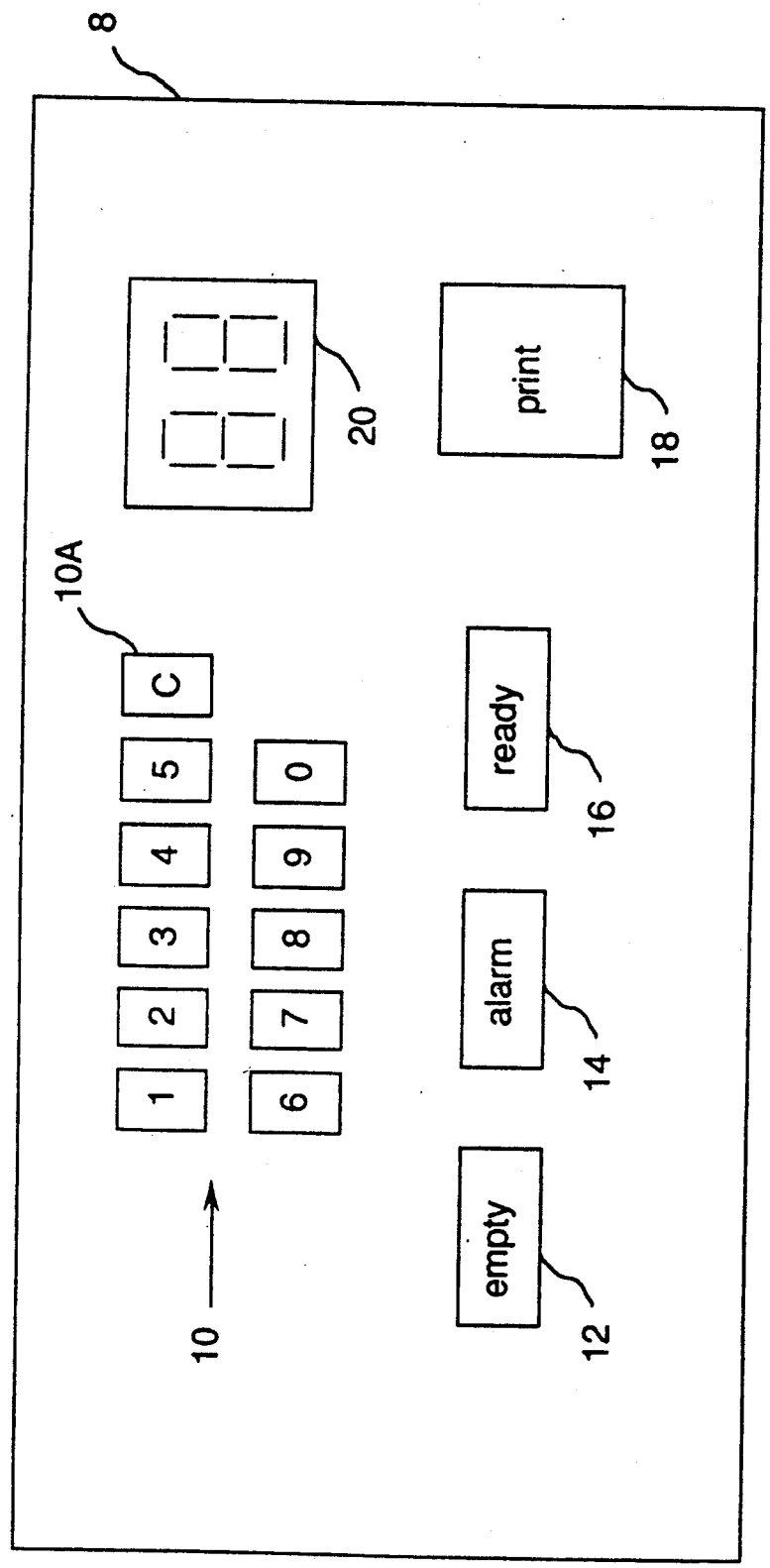
FIG. 2 is an explanatory view of a display panel of the laser printer.

The laser printer 1 further comprises a display panel 8 as shown in FIG. 2, which is provided on an upper surface thereof. The display panel 8 includes numeric keys 10 for inputting Arabic figures, a clear key 10A for canceling numeric inputs, a magazine empty lamp 12 for indicating that the entire roll paper P has been drawn out of the magazine 9, an alarm lamp 14, a print ready lamp 16 for indicating that the laser printer 1 is in a print enable state, a print key 18 for starting a printing operation, and an LED display 20 for providing a seven-segment display of an input numeric value and the like.

The paper feed mechanism 5 will be described in greater detail with reference to FIGS. 3 and 4 seen in the direction of arrow III in FIG. 1.

Figure 3:
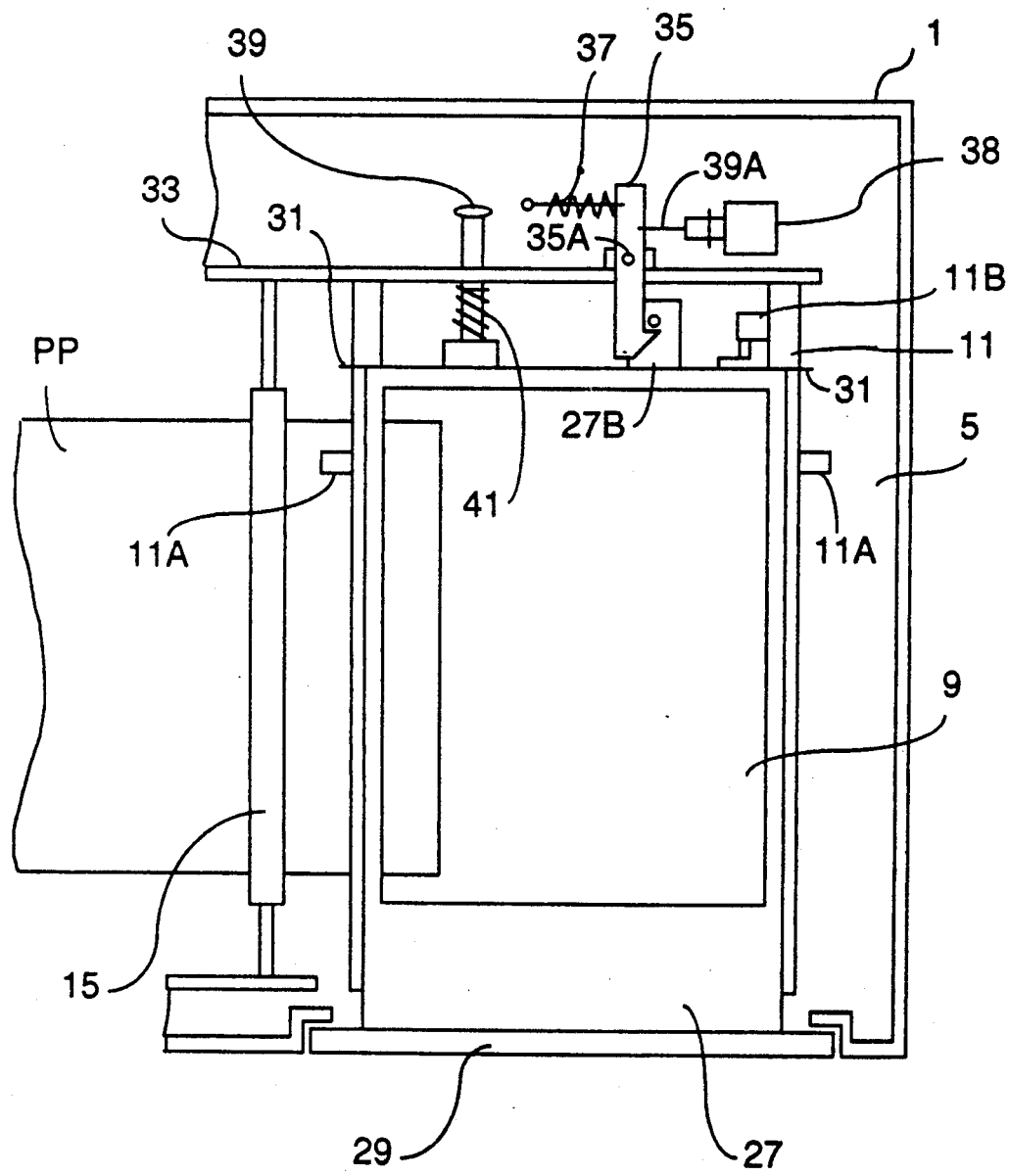
FIG. 3 is a detailed explanatory view of a paper supplying device of the laser printer.
Figure 4:
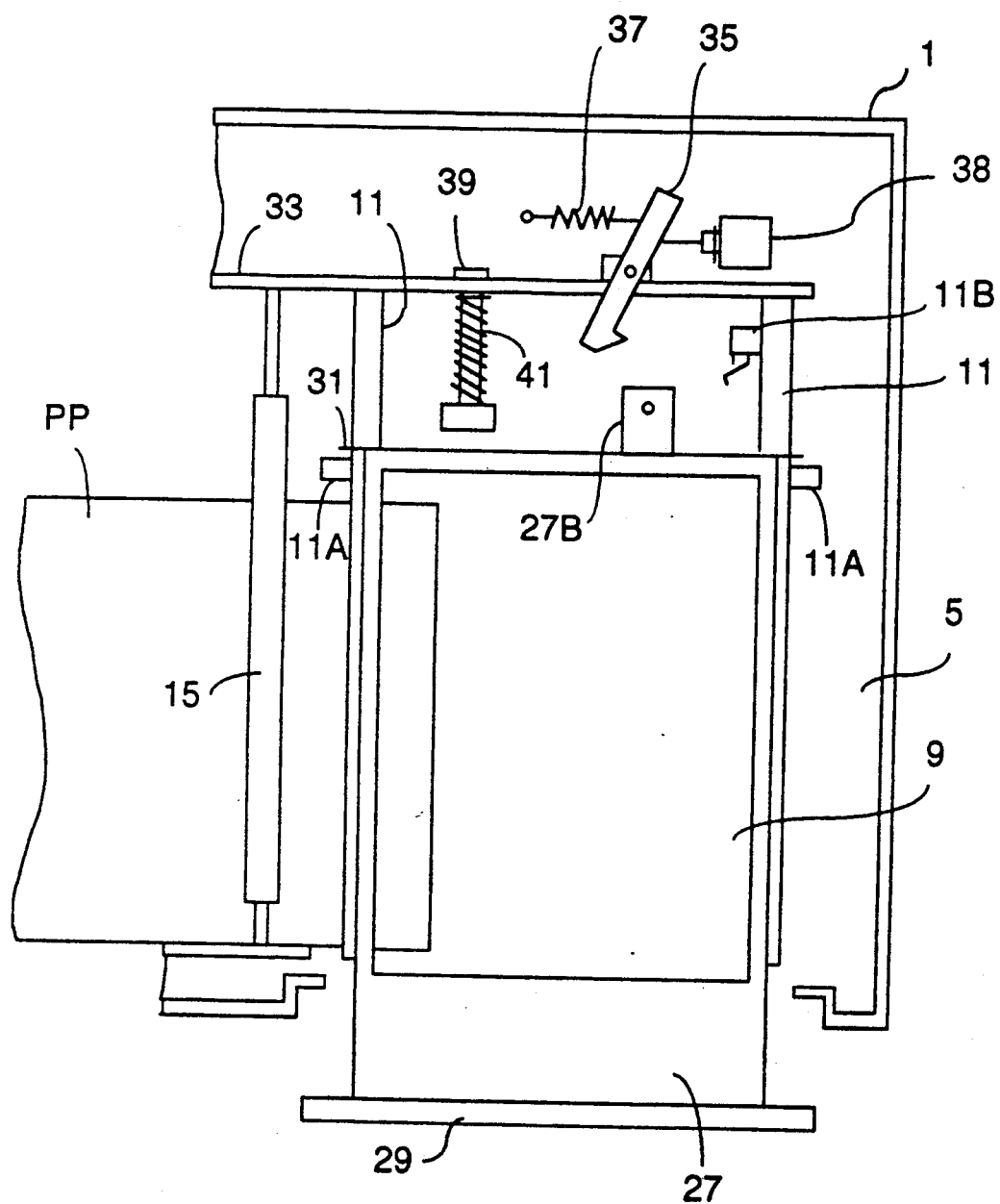
FIG. 4 is an explanatory view of an operation of the paper supplying device.

In FIGS. 3 and 4, the paper feed mechanism 5 includes a magazine table 27 mounted in a space for accommodating the magazine 9. The magazine table 27 is slidable on the guide rails 11 for supporting the magazine 9 in a predetermined posture.

The magazine table 27 carries a magazine cover 29 on a front end thereof for shutting out ambient light from the magazine 9 is position, and a pair of stopper pawls 31 projecting from opposite lateral edges of a read end thereof. The stopper pawls 31 are engageable with a pair of stoppers 11A projecting from the respective guide rails 11 away from each other. The stopper pawls 31 are formed of plate springs to be deformable under a certain load for disengaging from the stoppers 11A.

A magazine cover safety switch 11B is provided on one of the guide rails 11 for checking whether ambient light is positively shut out by the magazine cover 29. This switch 11B is normally turned off, and is turned on when the magazine table 27 is set to a home position at which the paper feed mechanism 5 is capable of supplying the roll paper P.

The magazine table 27 carries, on the rear end thereof, an engaging element 27B for engaging a lock lever 35 attached to a frame 33 to which the guide rails 11 are secured. The lock lever 35 is L-shaped so that one end thereof is engageable with the engaging element 27B. A normally compressed spring 37 is provided having one end thereof secured to an unillustrated frame, and the other end secured to the other end of the lock lever 35.

The lock lever 35 is pivotable about a pivotal axis 35A provided approximately midway longitudinally thereof, and therefore is constantly urged by the spring 37 for engagement with the engaging element 11A.

An electromagnetic solenoid 38 is provided having a movable rod 39A with a projecting end thereof, fixed to the lock lever 35, for imparting a pulling force exceeding the compression of spring 37 to break the engagement between the lock lever 35 and the engaging element 27B.

Further, the frame 33 carries a pusher 39 at a position opposed to the rear end of the magazine table 27 for urging the magazine table 27 forwardly. The pusher 39 is operable under the restoring force of a compression spring 41 which is gradually compressed as the magazine table 27 is caused to slide or pushed toward the above-mentioned home position.

Thus, the magazine table 27, engaging element 27B, lock lever 35, electromagnetic solenoid 38 and pusher 39 form the main components of a storage moving device in this embodiment.

Figure 5:
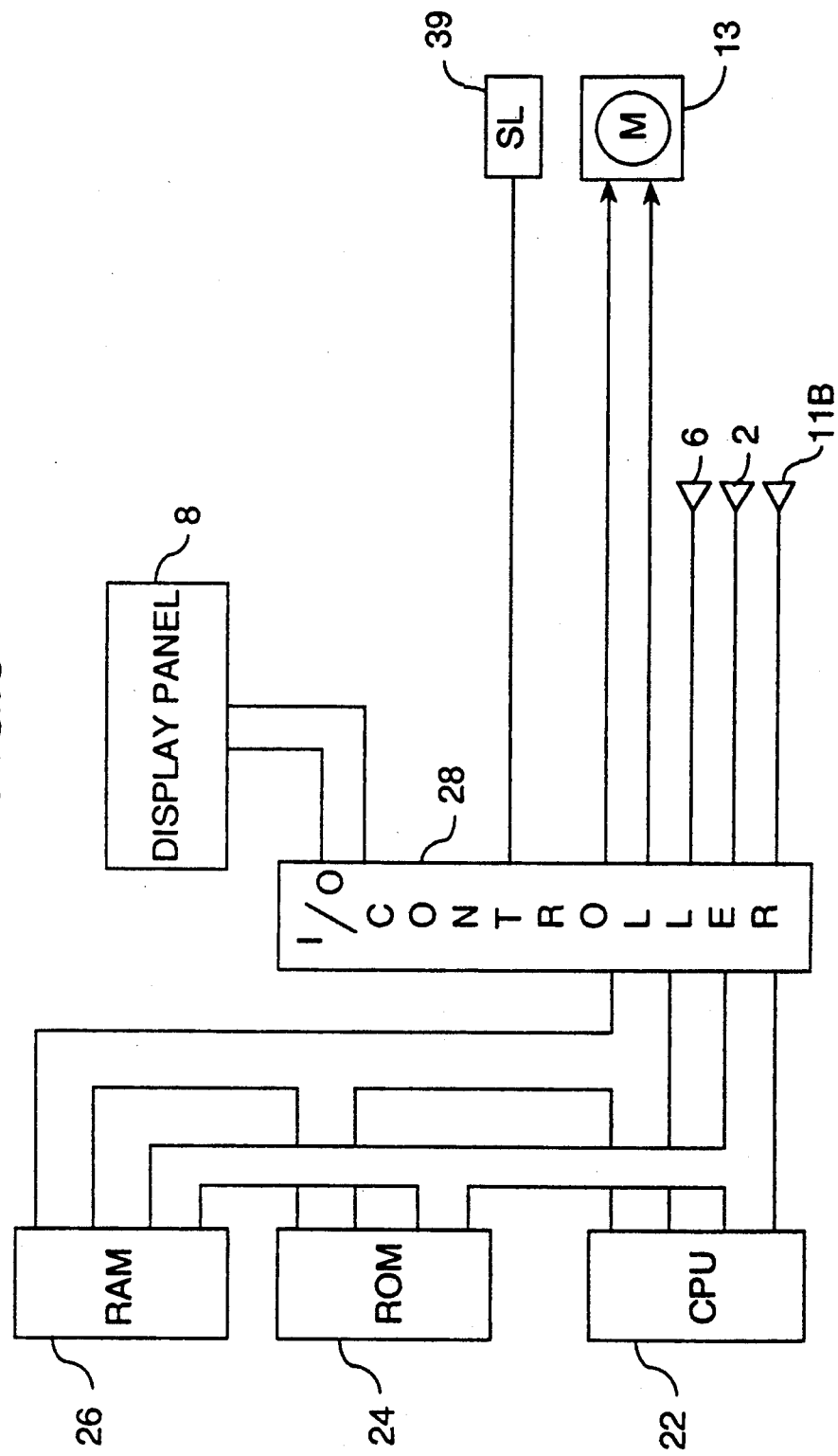
FIG. 5 is a block diagram of a main electric system for the laser printer.

FIG. 5 is a block diagram of a main electric system of the laser printer 1.

In FIG. 5, a CPU 22 forming a main component of a control device in this embodiment is operable according to a program stored in a program ROM 24 while storing various data in a working RAM 26.

The working RAM 26 receives various data from the display panel 8, jam sensor 6, end sensor 2 and magazine cover safety switch 11B through an input/output controller 28. Based on these data, the CPU 22 controls the roll drive motor 13 and other components through the I/O controller 28.

Figure 6:
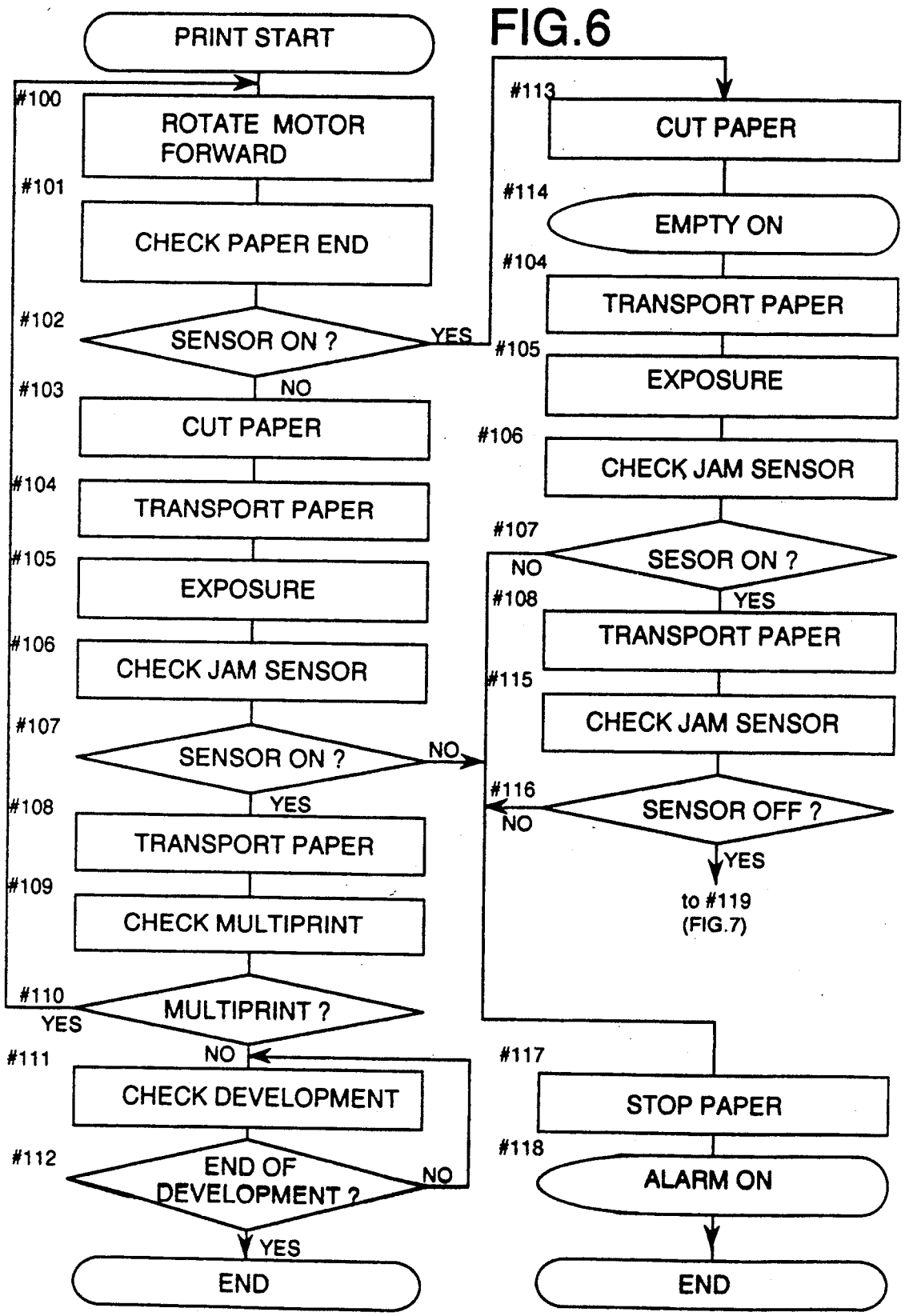
FIGS. 6 and 7 are flowcharts followed by the laser printer.
Figure 7:
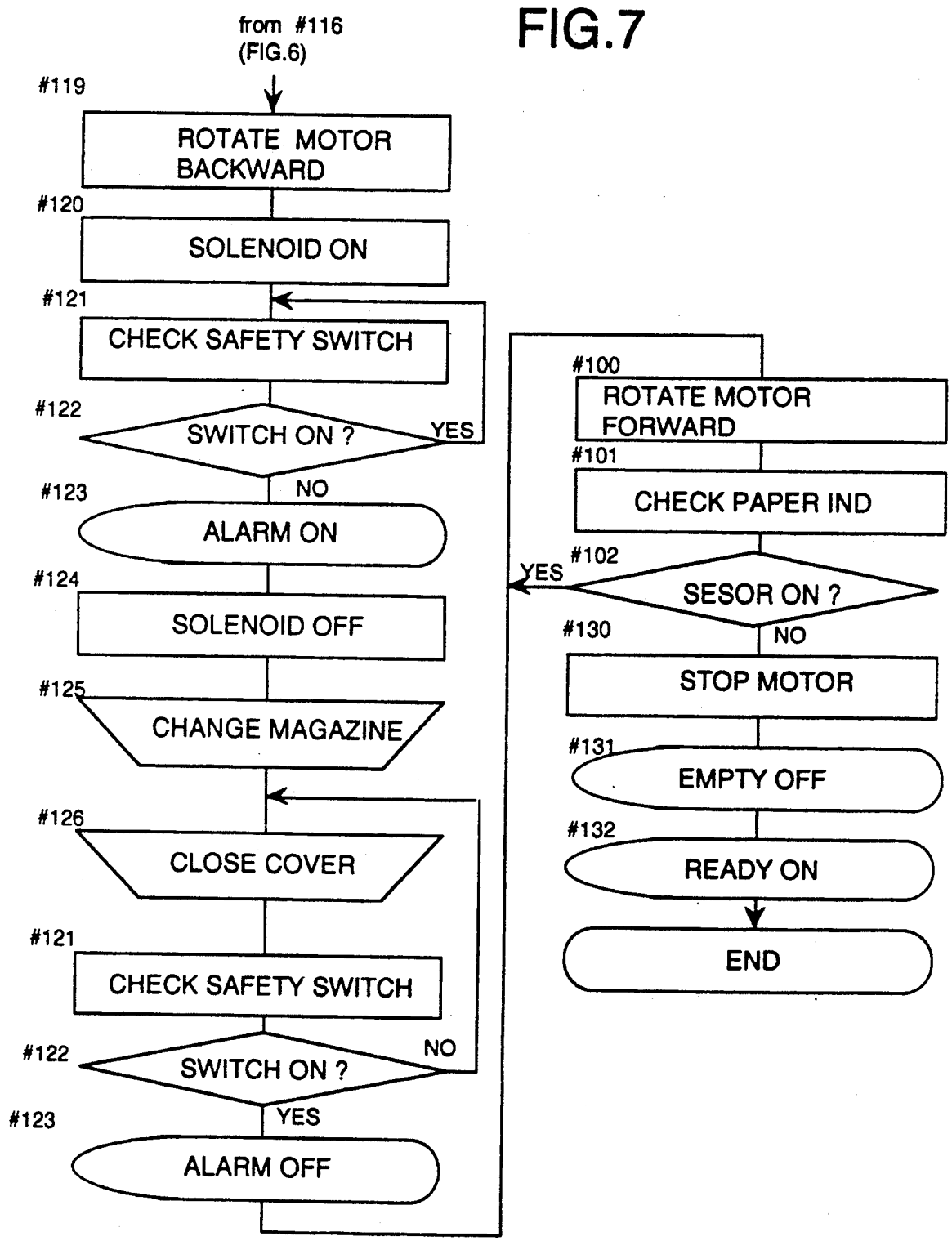
Figure 8:
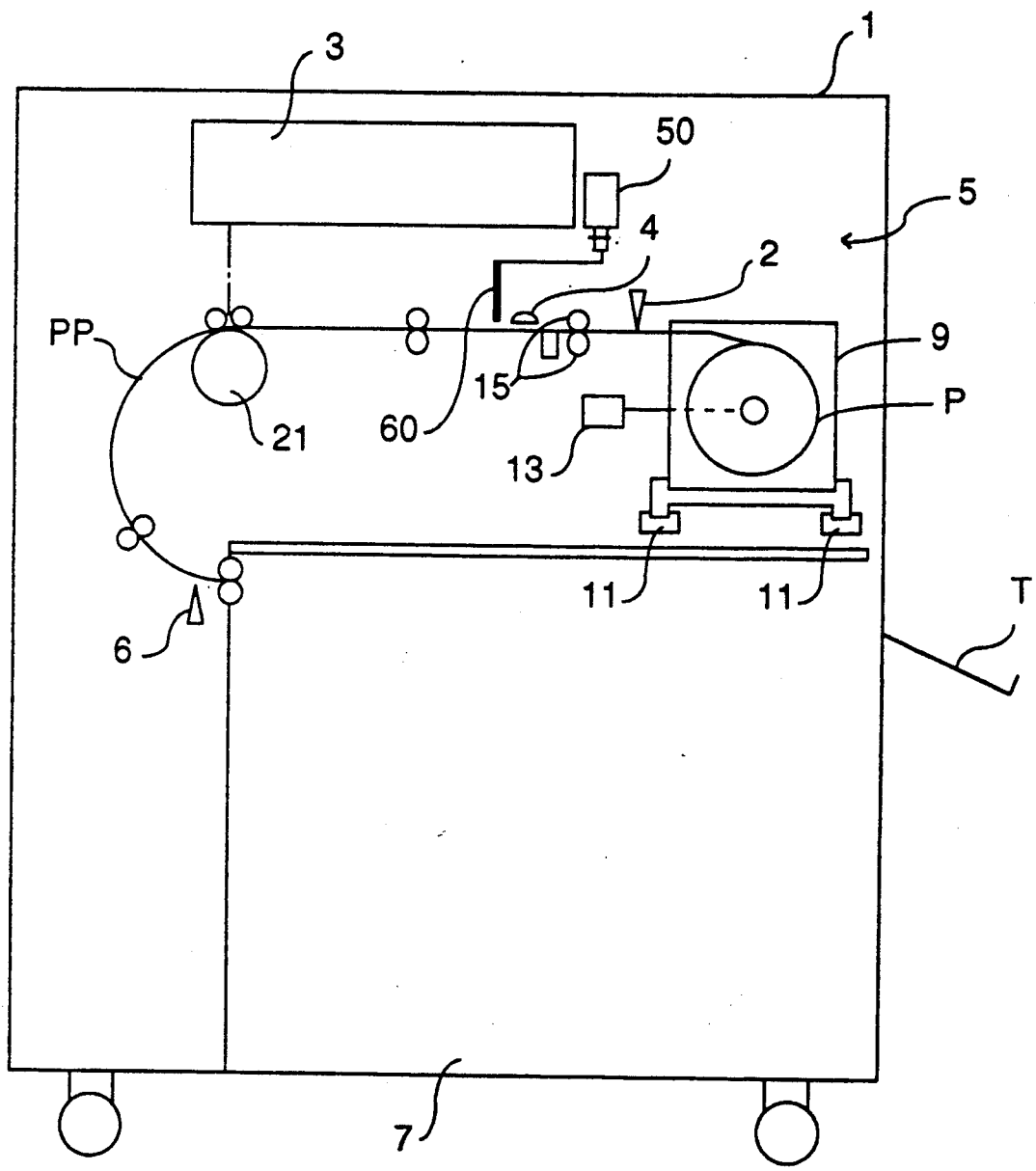
FIG. 8 is a schematic view of a modified laser printer according to the first embodiment of the invention.

The laser printer 1 in this embodiment is constructed as described above. The way in which the laser printer 1 operates will be described next with reference to the flowcharts shown in FIGS. 6 and 7.

These flowcharts include actions taken by the operator along with the processing carried out by CPU 22, and therefore differ from ordinary flowcharts followed by CPU 22.

At step #100, the roll drive motor 13 is rotated forward to dispense the roll paper P. It is then determined through the end sensor 2, at steps #101 and #102, whether the whole (or a predetermined quantity) of roll paper P has been drawn out or not.

The sensor 2 is operable to detect a mark at the rear end of the roll paper P by infrared radiation or other means. The sensor 2 is normally turned off, and is turned on when the end mark is detected. When the sensor 2 is turned on, a signal (data) is transmitted to the CPU 22 through the I/O controller 28. Subject to the input of this data, the CPU 22 carries out a control operation for protruding the magazine table 27 from the laser printer 1 in response to a signal output from the jam sensor 6 when the entire roll paper P has moved into the developer 7.

Thus, if step #102 finds the end sensor 2 turned off ("No" at step #102), the cutter 4 is driven to cut the roll paper P at step #103, and the transport roller 21 to transport the paper P to the laser optical system 3 at step #104, for exposure to the laser beam at step #105.

If the jam sensor 6 comprising a microswitch or the like is turned on, that is if the leading end of the exposed paper P has entered the developer 7 (step #106, and "Yes" at step #107), the transport of roll paper P is continued at step #108. At step #109, it is checked whether a multiprint (repetition of exposure and development, i.e. continuation of recording) should be carried out or not. If it should ("Yes" at step #110), the program returns to step #100 for repeating the above processes. Otherwise ("No" at step #110), the program terminates the operation after confirming completion of the development (step #111 and "Yes" at step #112).

Thus, if step #102 finds the end sensor 2 turned on ("Yes" at step #102), the cutter 4 is driven to cut the roll paper P at step #113, and the magazine empty lamp 12 is lit at step #114. Then the same processes as at steps #104 through #108 are carried out.

On the other hand, if step #107 finds the jam sensor 6 turned off, that is if the leading end of the exposed paper P does not enter the developer 7 ("Yes" at step #107), it indicates that a paper jam has occurred. Then, the transport of roll paper P is stopped at step #117, the alarm lamp 14 is lit at step #118, and the operation is suspended.

At step #115, it is checked whether the jam sensor 6 of off. If not ("No" at step #116), this is a case of paper jamming and the program moves to step #117. If the sensor 6 is turned on ("Yes" at step #116), this means that the paper P has completely entered the developer 7, and the program moves to the sequence shown in FIG. 7.

In this sequence, the roll drive motor 13 is rotated backward to take up the remaining part of the roll paper P at step #119, and then the electromagnetic solenoid 38 is electrified at step #1120 for causing the lock lever 35 to release the magazine table 27.

As a result, the magazine table 27 is moved by the pusher 39 to the position protruding from the laser printer 1. In this embodiment, the magazine table 27 is stopped at a position where the stoppers 11A and stopper pawls 31 engage each other.

Thereafter, it is checked to confirm that the magazine cover safety switch 11B is turned off (step #121 and "No" at step #122). Then the alarm lamp 14 is lit at step #123, and the electromagnetic solenoid 38 is de-electrified at step #124.

Subsequently, at step #125, the magazine 9 is changed for replenishing the roll paper P. After the magazine cover 29 is closed at step #126, the same processes as at steps #121 through #123 are carried out, which are followed by the same processes as at steps #100 and #101.

Next, the roll drive motor 13 is stopped at step #130, the magazine empty lamp 12 is turned off at step #131, and the print ready lamp 16 is turned on at step #132.

In this embodiment, as described above, when the end sensor 2 detects the whole or a predetermined quantity of the roll paper P having been drawn out of the magazine 9, the CPU 22, in response to the data received from the jam sensor 6, causes the storage moving device mainly comprising the magazine table 27, pusher 39 and so on to move the magazine 9 to the position protruding from the laser printer 1.

Thus, the operator is allowed to visually recognize the magazine table 27 (or magazine 9) protruding from the laser printer 1. This is possible with little influence of the distance and positional relationship between the laser printer 1 and the operator, including the case of the operator being remote from the laser printer 1.

As a result, the operator positively becomes aware of the timing for replenishing the roll paper P.

The need for paper replenishment is automatically notified under control by the CPU 22. This facilitates control of the laser printer 1, and realizes a very high operating efficiency.

In addition, the magazine 9 is not moved before the paper P has entered the developer 7 and the paper P on which an image has been formed reaches a state safeguarded against exposure. Thus, there is no danger of the paper P comprising a photosensitive material becoming exposed to ambient light.

Next, a modification to the foregoing first embodiment of the present invention will be described with reference to FIGS. 8 through 11.

In the following description, like parts are labeled with like reference numerals with respect to FIGS. 1, 5, 6 and 7, and are not described again.

The modified laser printer 1 includes a shutter 60 disposed on the transport path of the paper P downstream of the cutter 4 for protecting the roll paper P from ambient light. The shutter 60 is driven by a shutter solenoid 50.

Figure 9:
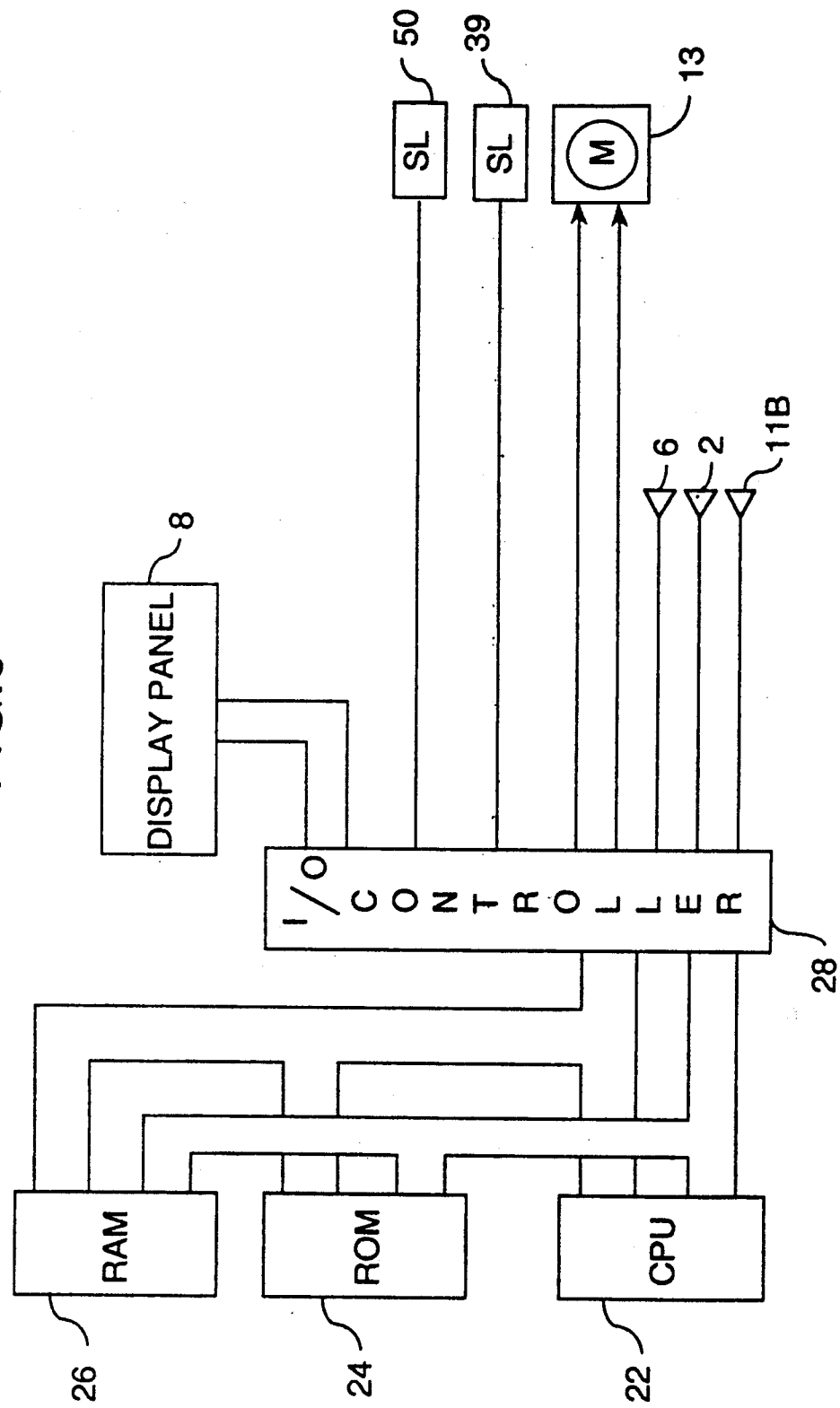
FIG. 9 is a block diagram of a main electric system of the laser printer shown in FIG. 8, FIGS. 10 and 11 are flowcharts followed by the laser printer shown in FIG. 8.

As shown in FIG. 9, the CPU 22 controls the shutter solenoid 50 through the I/O controller 28.

Figure 11:
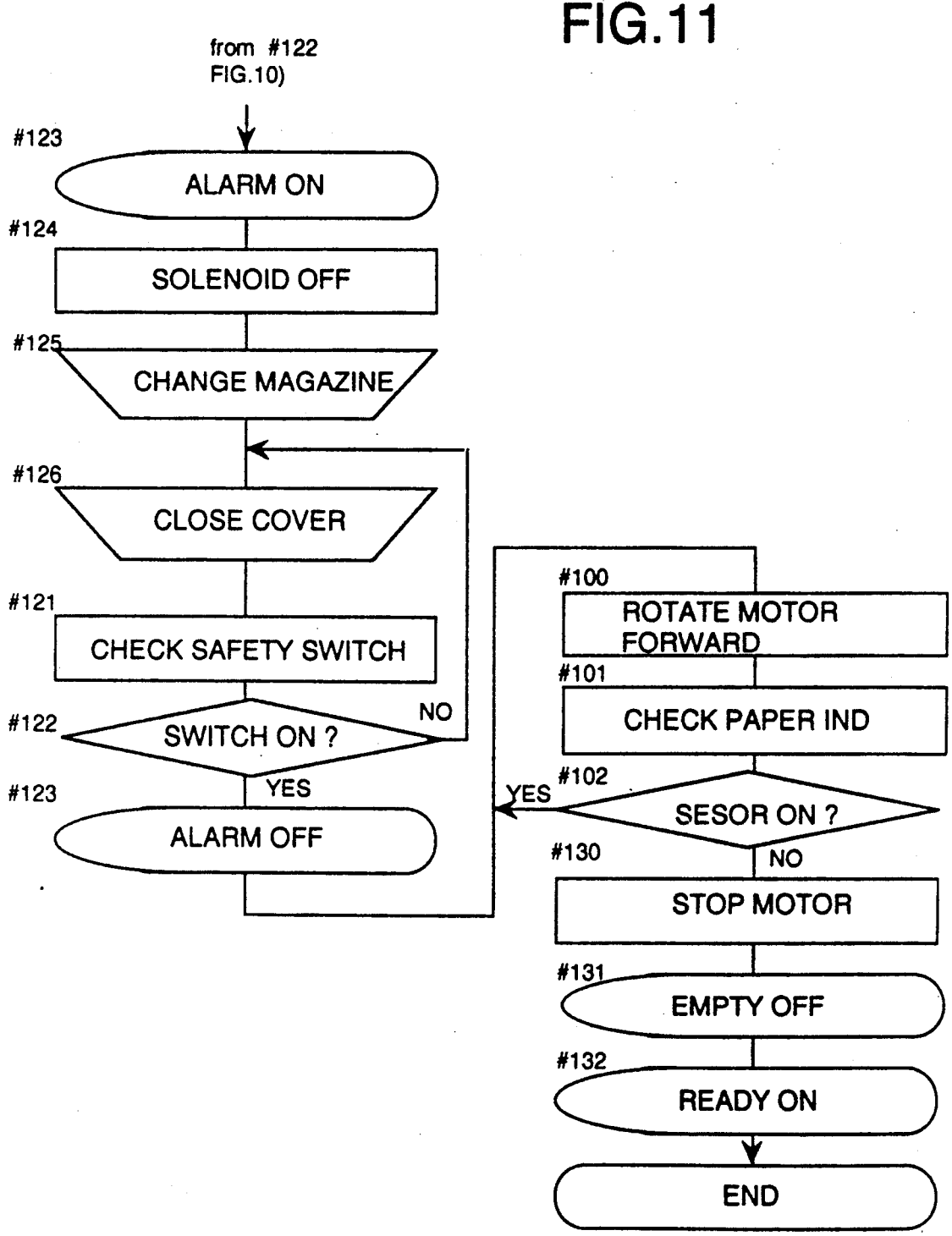

With the laser printer 1 having the above construction, as shown in FIGS. 10 and 11, the shutter solenoid 50 is driven to open the shutter 60 at step #200, and then the same processes are carried out as at steps #100 through #112, #113, #114, #117 and #118 in the foregoing embodiment. These steps are labeled with the same step numbers.

In the modified example, the magazine table 27 is moved when the shutter solenoid 50 is de-electrified, that is when the shutter 60 is closed.

Thus, at step #210, the program waits the time corresponding to each size of the paper P for passage of the roll paper P through the shutter 60. Then the shutter 60 is closed at step #220, and the roll drive motor 13 is rotated backward to take up the remaining part of the roll paper P at step #119.

Subsequently, steps #120 through #132 are executed as in the first embodiment.

As described above, the modified example differs from the foregoing first embodiment only in that the magazine table 27 is moved when the shutter 60 is closed. Therefore, the modified example produces the same effect as the first embodiment. Since the magazine table 27 is moved earlier than input of the data from the jam sensor 6 to CPU 22, the roll paper P is replenished with better timing.

2. Second Embodiment

Figure 12:
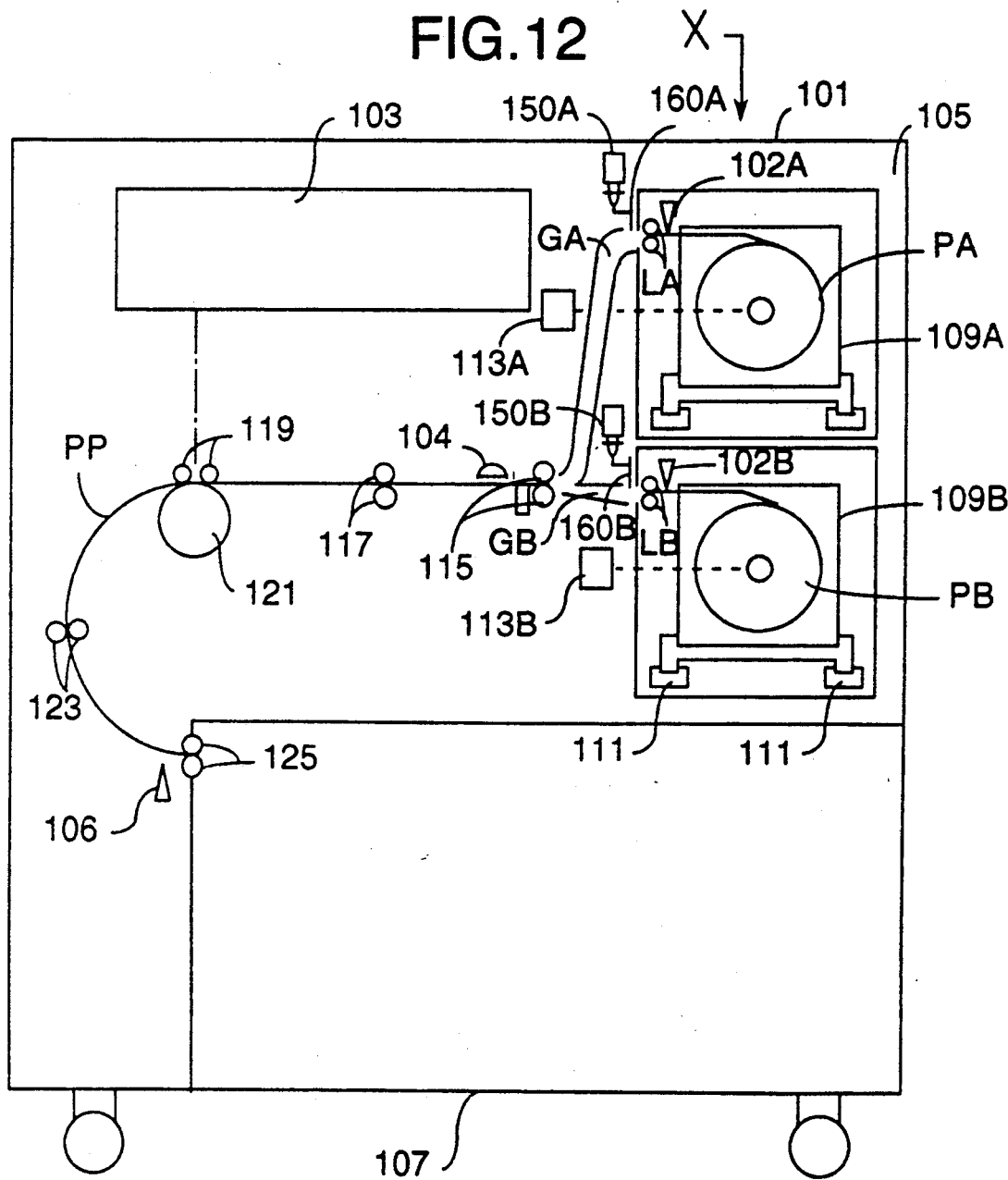
FIG. 12 is a schematic view of a laser printer forming a second embodiment of the present invention.

FIG. 12 schematically shows a laser printer 101 having a recording material supplying device, which is an example of recording apparatus forming a second embodiment of the present invention. The recording material supplying device in the second embodiment also is in the form of a paper feed mechanism 105 that supplies the laser printer 101 with a rolled recording material (roll paper PA and PB) formed of a photosensitive material such as a silver salt film.

The laser printer 101 comprises, as main components thereof, a laser optical system 103 for emitting a laser beam, the paper feed mechanism 105 for supplying the roll paper to the laser optical system 103, and a developer 107 for developing the paper exposed to the laser beam.

The paper feed mechanism 105 includes, as main components thereof, two pairs of guide rails 111 for supporting magazines (storages) 109A and 109B, respectively, which interchangeably store the roll paper, roll drive motors 113A and 113B rotatable in opposite directions and acting as drive sources for dispensing and taking up the roll paper, and feed rollers 115 for transporting the roll paper.

The second embodiment includes two magazine tables 127 for supporting the magazines 109A and 109B, respectively. The roll paper PA or PB mounted in each of the magazine 109A and 109B is introduced to the guide rollers 115 through a guide GA or GB surrounding the roller paper. Upstream of the respective guides GA and GB are shutters 160A and 160B for preventing ambient light from entering the guides GA and GB. The shutters 160A and 160B are opened and closed by shutter solenoids 150A and 150B, respectively.

End sensors 102A and 102B (detecting devices) are disposed upstream of the feed rollers 115 along transport paths of the roll paper PA and PB for detecting the whole (or a predetermined quantity) of the roll paper drawn out of the magazines 109A and 109B. Downstream of the feed rollers 115 is a cutter 104 for cutting a rear end of the roll paper.

The transport path of the paper from the feed rollers 115 downstream to the developer 107 includes guide rollers 117 and 119, a transport roller 121, and guide rollers 123 and 125. A jam sensor 106 such as an ultrasonic sensor is disposed immediately upstream of the guide rollers 125 for detecting entry of the paper to the developer 7.

Figure 13:
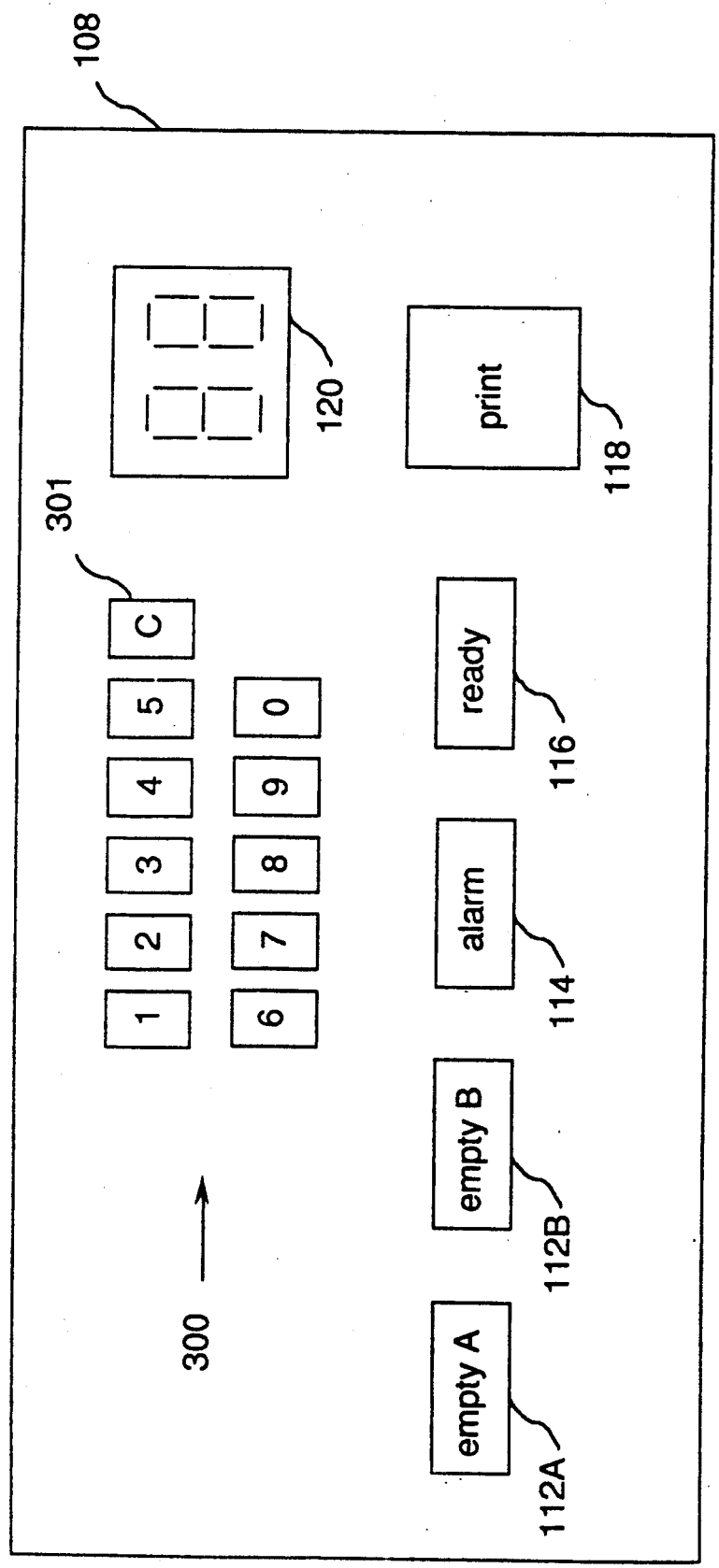
FIG. 13 is an explanatory view of a display panel of the laser printer shown in FIG. 12.
Figure 14:
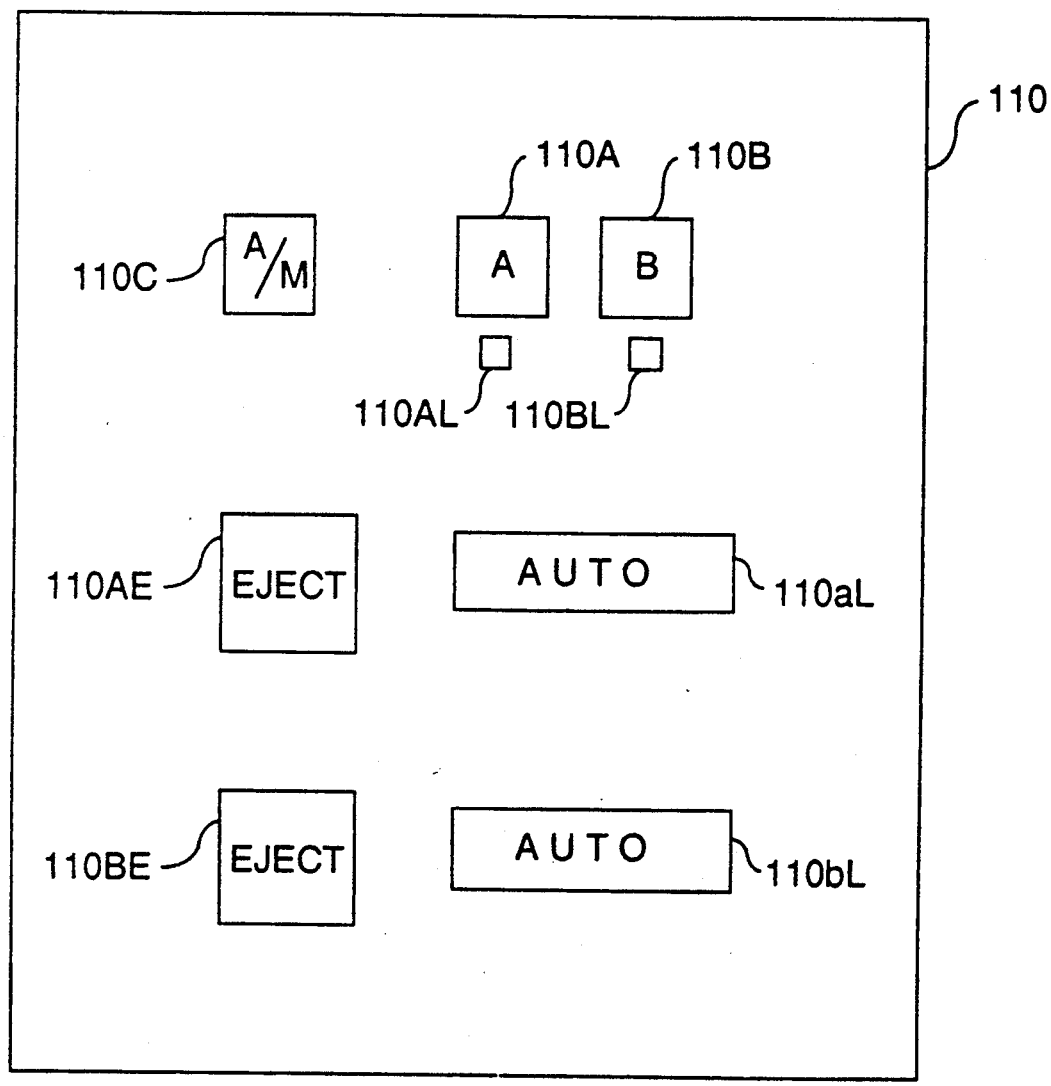
FIG. 14 is an explanatory view of a magazine select panel of the laser printer shown in FIG. 12.

The laser printer 101 further comprises a display panel 108 and a magazine select panel 110 as shown in FIGS. 13 and 14, respectively, which are provided on an upper surface thereof. The display panel 108 includes numeric keys 300 for inputting Arabic figures, a clear key 301 for canceling numeric inputs, two magazine empty lamps (empty A) 112A and (empty B) 112B each for indicating that the entire roll paper PB has been drawn out of the magazine 109A or 109B, an alarm lamp 114, a print ready lamp 116 for indicating that the laser printer 1 is in a print enable state, a print key 118 for starting a printing operation, and an LED display 120 for providing a seven-segment display of an input numeric value and the like.

The magazine select panel 110 includes magazine select buttons 110A and 110B, such as toggle switches, for selecting the magazine 109A or 109B to supply the roll paper PA or PB, select lamps 110AL and 110BL which are lit when the corresponding magazine select buttons 110 and 110B are pressed, an AUTO/-MANUAL changeover button 110C for selecting between a mode for causing the magazine 109A or 109B to be automatically protruded from the laser printer 1 and a state for causing the magazine 109A or 109B to be protruded manually by pressing a magazine eject button 110A or 110B such as a toggle switch, and indicator lamps 110aL and 110bL which are lit when the corresponding magazine select buttons 110A and 110B are pressed with the AUTO/MANUAL changeover button 110C turned on.

For drawing the roll paper PA and PB continuously from both of the magazines 109A and 109B, the roll paper PB is mounted in the magazine 109B which is the same size as or larger than the roll paper PA mounted in the magazine 109A, and both of the magazine select buttons 110A and 110B are pressed to the ON state.

When the AUTO/MANUAL changeover button 110C is turned on, depression of the magazine eject button 110AE or 110BE does not cause movement of magazine table 127, i.e. discharge of the magazine 109A or 109B. This is effective for preventing an operational error.

The construction of paper feed mechanism 105 is entirely the same as in the first embodiment, and is not described again. The view taken in the direction of arrow X of FIG. 12 corresponds to FIGS. 3 and 4 described hereinbefore.

Figure 15:
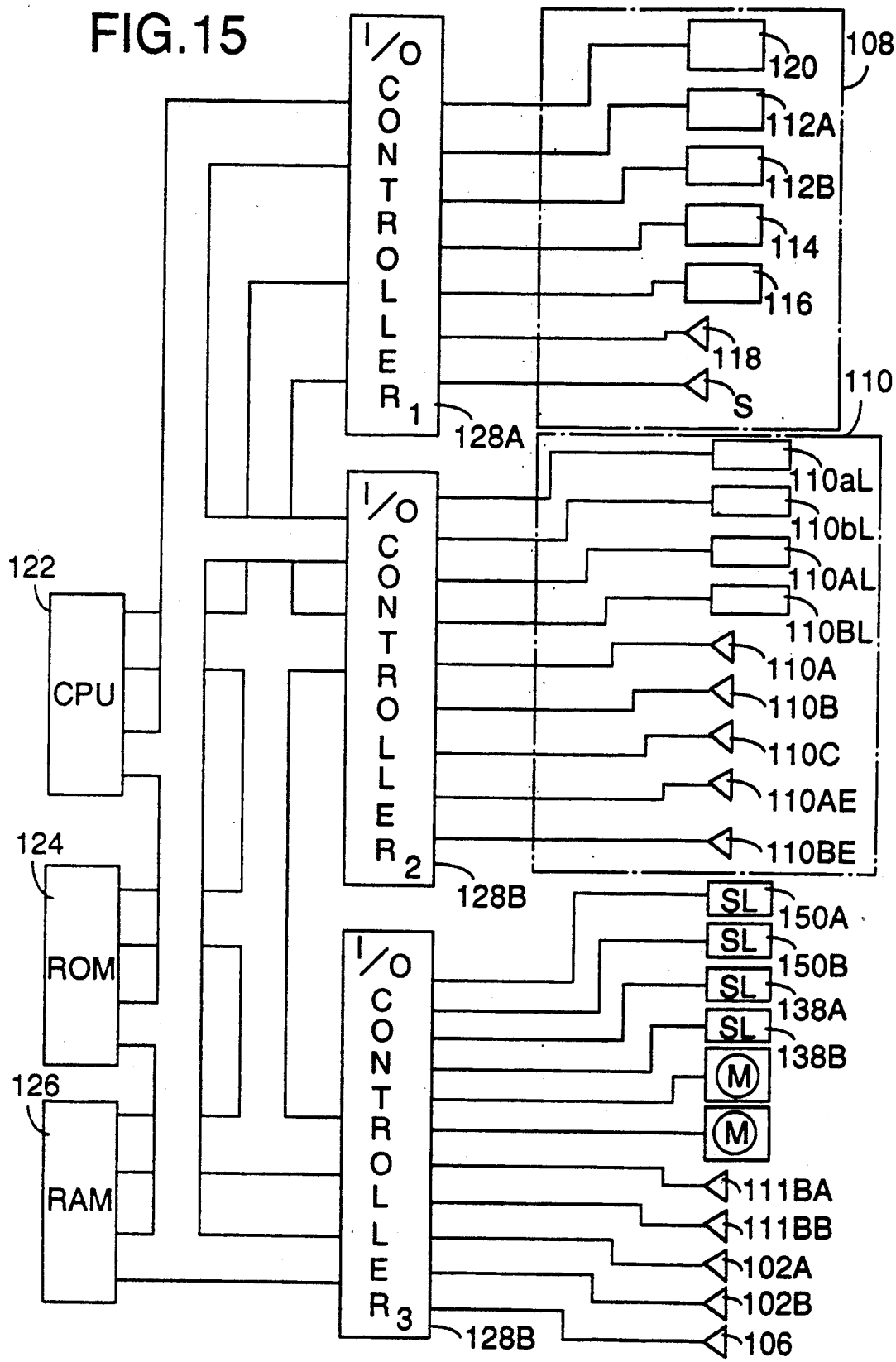
FIG. 15 is a block diagram of a main electric system of the laser printer shown in FIG. 12, and FIGS. 16 through 18 are flowcharts followed by the laser printer shown in FIG. 12.

FIG. 15 is a block diagram of a main electric system of the laser printer 101.

In FIG. 15, a CPU 122 forming a main component of a control device in this embodiment and acting as a storage movement and removal instructing device is operable according to a program stored in a program ROM 124 while storing various data in a working RAM 126.

The working RAM 126 receives various data from the display panel 108, magazine select panel 110, jam sensor 106, two end sensors 102A and 102B and two magazine cover safety switches 111BA and 111BB through three input/output controllers 128A, 128B and 128C. Based on these data, the CPU 122 controls the roll drive motors 113A and 113B and other components through the I/O controllers 128A, 128B and 128C.

Figure 16A:
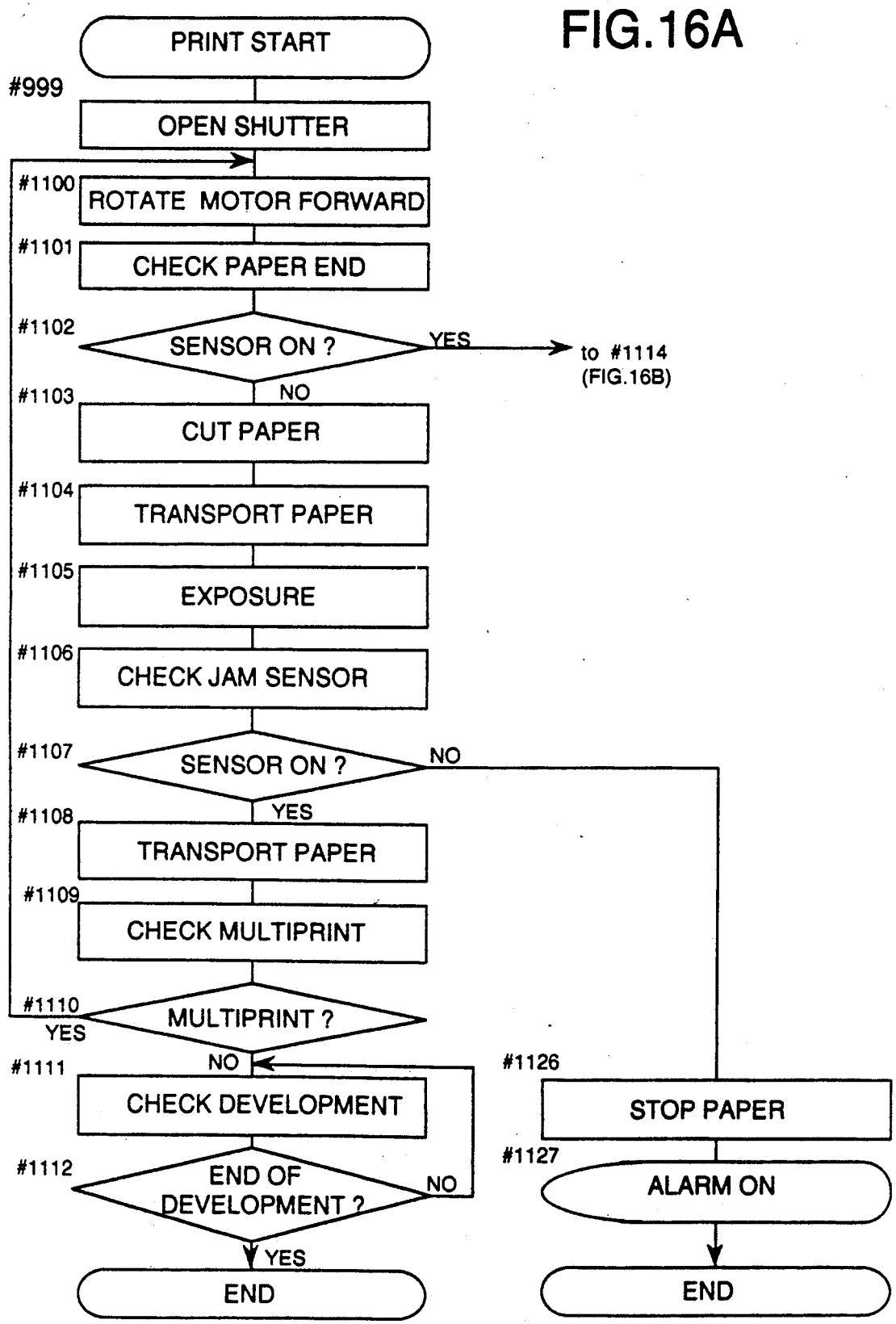
Figure 16B:
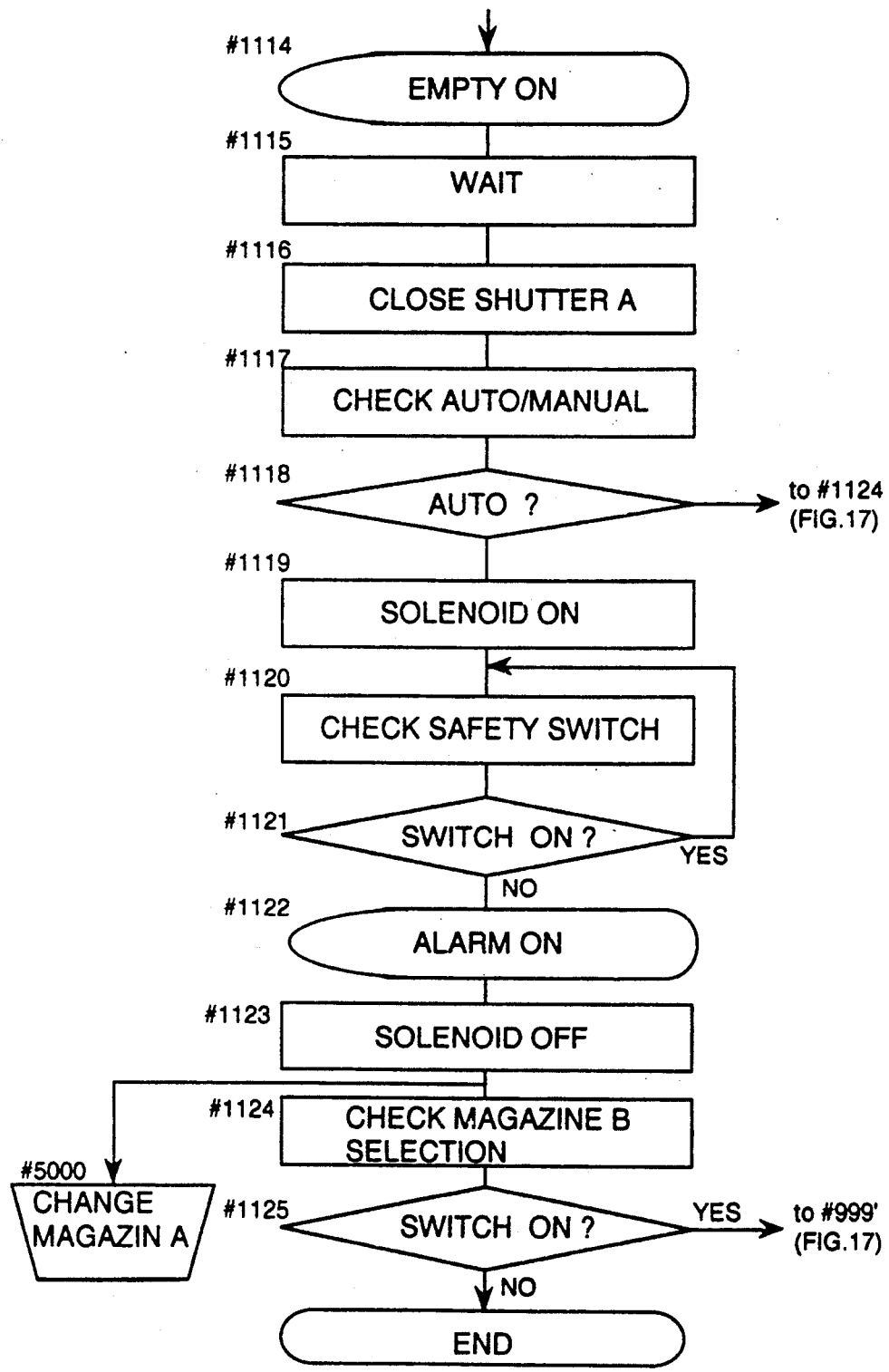

The laser printer 101 in this embodiment is constructed as described above. The way in which the laser printer 101 operates will be described next with reference to the flowcharts shown in FIGS. 16 through 18.

These flowcharts include actions taken by the operator along with the processing carried out by CPU 122, and therefore differ from ordinary flowcharts followed by CPU 122.

In this embodiment, the roll paper PA is first drawn out of the magazine 9A of the two magazines mounted on the two magazine tables 127. When the magazine 9A becomes empty, the roll paper PB is drawn out of the magazine 9B.

At step #999, the shutter solenoid 150A is electrified to open the shutter 160A. At step #1000, the roll drive motor 113 is rotated forward to dispense the roll paper. It is then determined through the end sensor 102A, at steps #1101 and #1102, whether the whole (or a predetermined quantity) of the roll paper has been drawn out or not.

The sensors 102 are operable to detect a mark at the rear end of the roll paper by infrared radiation or other means. The sensors 102 are normally turned off, and are turned on when the end mark is detected. When each sensor 102 is turned on, a signal (data) is transmitted to the CPU 122 through the I/O controller 128. Subjected to the input of this data, the CPU 122 carries out a control operation for protruding the magazine table 127 from the laser printer 101 in response to a signal output from the jam sensor 106 when the entire roll paper has moved into the developer 107.

Thus, if step #1102 finds the end sensor 102A turned off ("No" at step #1102), the cutter 104 is driven to cut the roll paper at step #1103, and the transport roller 121 to transport the paper to the laser optical system 103 at step #1104, for exposure to the laser beam at step #1105.

If the jam sensor 106 is turned on, that is if the leading end of the exposed paper has entered the developer 107 (step #1106, and "Yes" at step #1107), the transport of the paper is continued at step #1108. At step #1109, it is checked whether a multiprint (repetition of exposure and development, i.e. continuation of recording) should be carried out or not. If it should ("Yes" at step #1110), the program returns to step #1000 for repeating the above processes. Otherwise ("No" at step #1110), the program terminates the operation after confirming completion of the development (step #1111 and "Yes" at step #1112).

On the other hand, if step #1102 finds the end sensor 102 turned ("Yes" at step #1102), the cutter 104 is driven to cut the roll paper, and the magazine empty lamp 112 is lit at step #1114. The program waits for the rear end of the roll paper (which is freed from the roll axis) to pass through the shutter 160A at step #1115, and closes the shutter at step #1116.

If step #1107 finds the jam sensor 106 turned off, that is if the leading end of the exposed paper does not enter the developer 107 ("Yes" at step #1107), it indicates that a paper jam has occurred. Then, the transport of the paper is stopped at step #1126, the alarm lamp 114 is lit at step #1127, and the operation is suspended.

Next, at step #1117, it is checked whether the AUTO/MANUAL changeover button 110C is off. If it is on ("Yes" at step #1118), the program moves to step #1119. If it is off ("No" at step #1118), the program moves to step #1124 in FIG. 17.

At step #1119, the electromagnetic solenoid 138A is electrified for causing the lock lever 135 to release the magazine table 127.

As a result, the magazine table 127 is moved by the pusher 139 to a position protruding from the laser printer 101. In this embodiment, the magazine table 127 is stopped at a position where the stoppers 111A and stopper pawls 131 engage each other.

Thereafter, it is checked to confirm that the magazine cover safety switch 111BA is turned off (step #1120 and "No" at step #1121). Then the alarm lamp 114 is lit at step #1122, and the electromagnetic solenoid 138A is de-electrified at step #1123.

Subsequently, at step #5000, the magazine 109A is replenished with the roll paper PA. The program then moves to step #999' in FIG. 17 provided that the magazine select button 110B is turned on (#1124 and "Yes" at #1125).

Since the shutter 160A is closed at this time, there is no ambient light entering through the guide GA provided for the magazine 109A.

Figure 17:
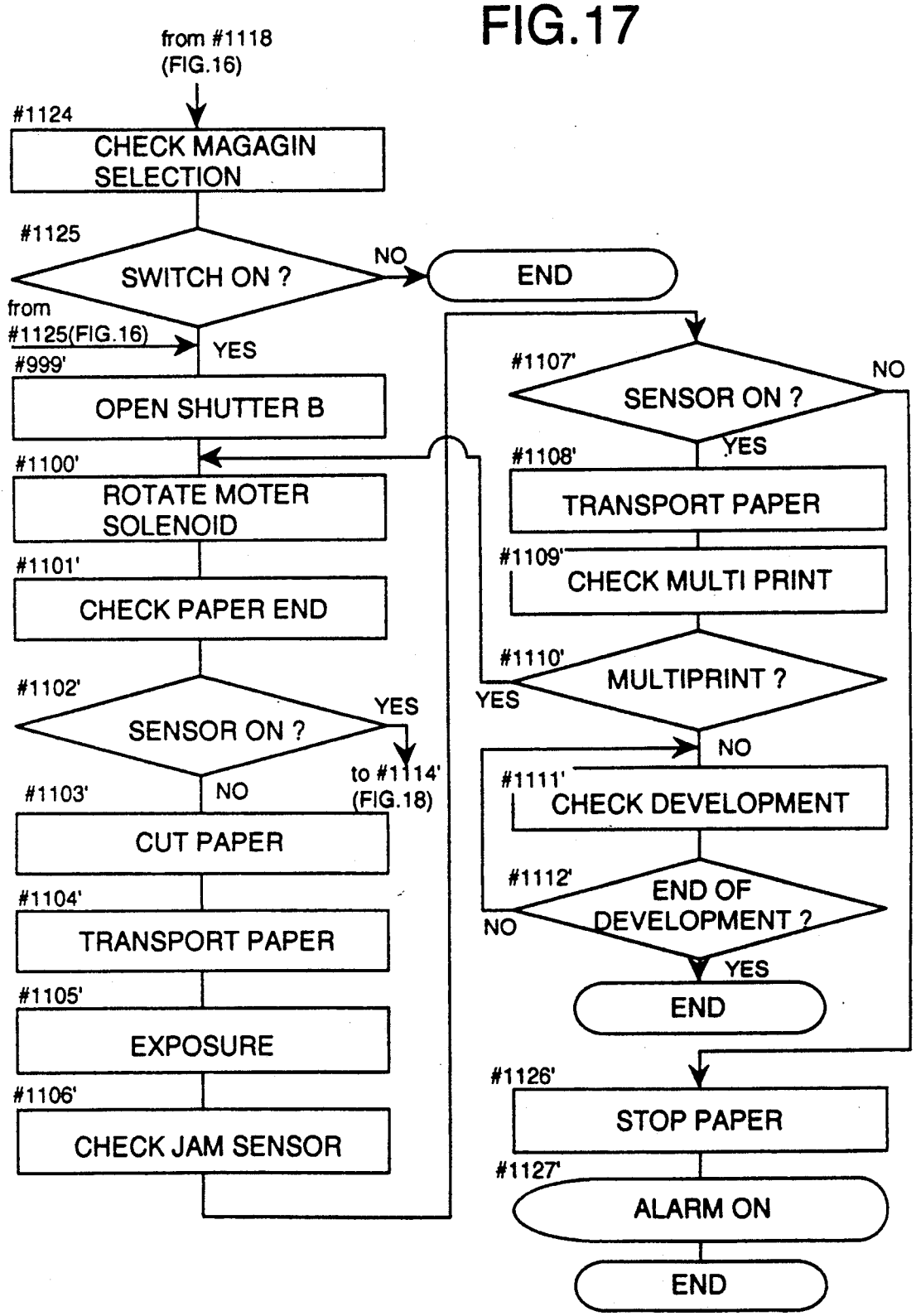

On the other hand, in the event of "No" at step #1118, the program moves to steps #1124 and #1125 in FIG. 17. Thereafter, steps #999' through #1123', #6000, #1126' and #1127' are exhausted for the roll paper PB in the magazine 109B, which are similar to the foregoing steps #999 through #1123, #1126 and #1127.

Figure 18:
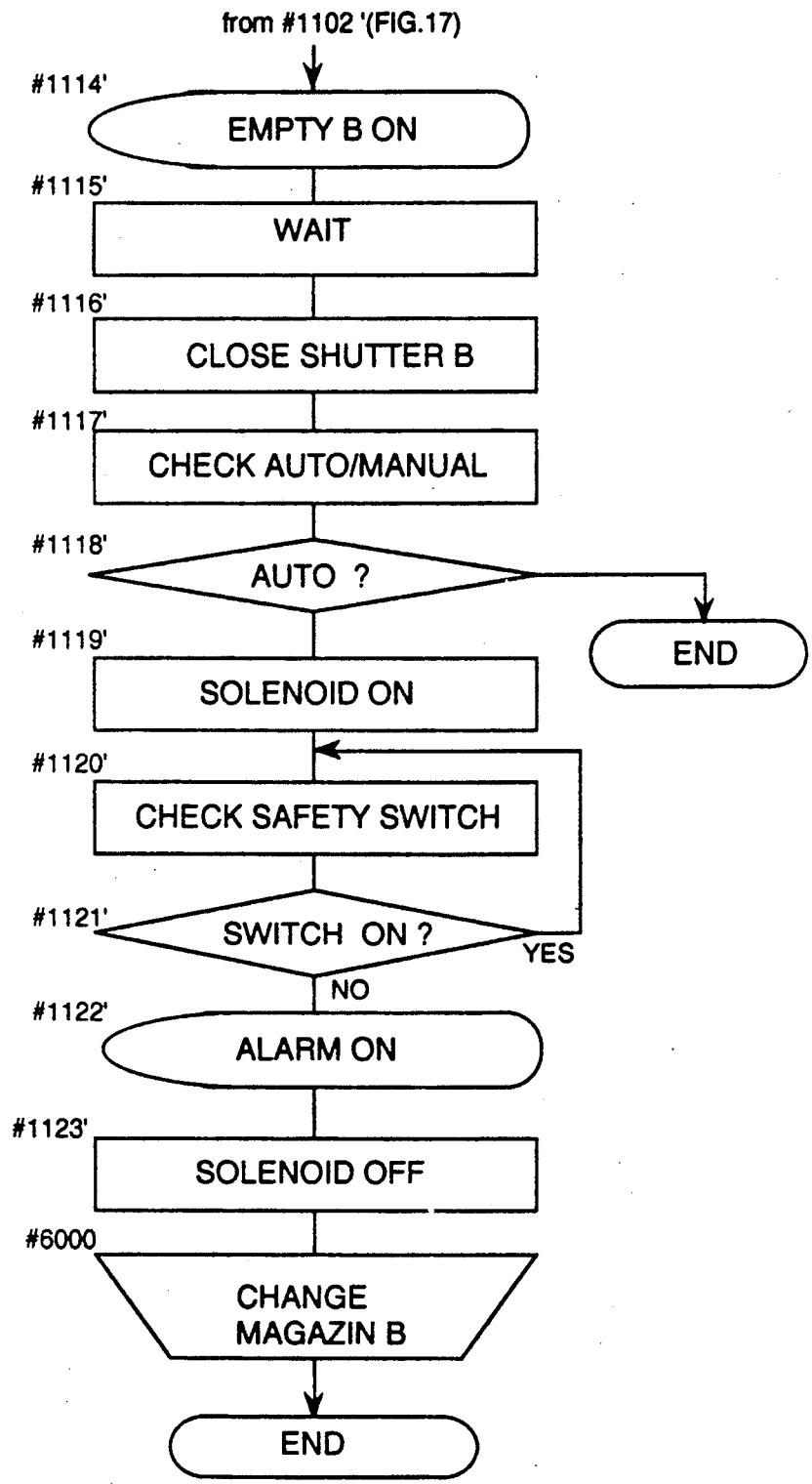

As seen from FIG. 17, in the event of "Yes" at step #1102', the program moves to the sequence shown in FIG. 18 for executing steps #1114' through #6000.

In this embodiment, the magazine 109B is used after the magazine 109A is exhausted. The program may be flowcharted to check and use the magazine 109A again after the magazine 109B is exhausted.

In this embodiment, as described above, when the end sensor 102 detects the whole of the roll paper PA having been drawn out of the magazine 109A, the CPU 122, in response to the data received from the jam sensor 106, causes the storage moving device mainly comprising the magazine tables 127, pushers 139 and so on to move the magazine 109A to the position protruding from the laser printer 101 and to draw the roll paper PB from the magazine 109B.

Thus, the operator is allowed to visually recognize the magazine table 127 (or magazine 109A) protruding from the laser printer 101. This is possible with little influence of the distance and positional relationship between the laser printer 101 and the operator, including the case of the operator being remote from the laser printer 101.

As a result, the operator positively becomes aware of the timing for replenishing the roll paper, and is allowed to visually recognize which magazine is empty.

This is automatically notified under control by the CPU 122, which facilitates control of the laser printer 101, and realizes a very high operating efficiency.

In addition, the magazine 109A or 109B is not moved before the shutter corresponding to each storage of the roll paper is closed. Thus, there is no danger of the roll paper in the process of image formation becoming exposed to ambient light.

The roll paper PB may be continuously supplied from the magazine 109B even when the magazines 109A and 109B contain different size roll papers PA and PB and the magazine select button 110A only is turned on. For this purpose, each roll paper may include a bar code indicating its size, with the laser printer 101 including a bar code reader. The continuous supply of the roll paper PB is enabled if its size as read by the bar code reader is large enough to record an image by a printing process for the magazine 109A.

Further, in this embodiment, supply of a desired quantity of the recording material is confirmed through detection by the end sensors 102 of the mark provided at the rear end of the roll paper. Instead, the remaining quantity of paper may be determined by detecting the weight of each magazine, for example.

3. Other Embodiments

The recording material used with the recording apparatus according to the present invention is not limited to roll paper as described in the first and second embodiments. A wide variety of recording materials may be used, such as cut sheets.

In the first and second embodiments, the present invention is applied to laser printers. The invention is not limited to such application but may be applied to a thermal printer or other recording apparatus as well.

While the first and second embodiments have been described as employing a photosensitive recording material, the present invention may employ ordinary paper. Where the recording apparatus comprises a thermal printer, heat sensitive paper may be used.

In the first and second embodiments, the magazine or magazines for storing the recording material is/are completely contained inside the apparatus body. However, the magazine or magazines (or unit or units) may protrude from the apparatus body when in a state for supplying the recording material into the apparatus body. In this case, when the magazine or unit becomes empty of the recording material, it may be protruded to a large extent for notifying the empty state to the operator. It is desirable that the direction in which the magazine or unit is protruded from the apparatus body corresponds to the direction in which the recording material is supplied into the apparatus body.

In the second embodiment, input instructions are given for a plurality of magazines to be used. Instead, when one magazine becomes empty, an automatic switch may be made to a second magazine for supplying the recording material provided that the two magazines store the same size recording material.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A recording apparatus for recording information on a recording material, comprising:
   an apparatus body including a recording station;
   storing means for storing the recording material therein, said storing means being movable between a first position for supplying the recording material to said recording station and a second position protruding from said apparatus body;
   detecting means for detecting a quantity of the recording material stored in said storing means; and
   means responsive to said detecting means for moving said storing means from the first position to the second position upon lapse of a predetermined time after said detecting means detects that the quantity of the recording material is less than a predetermined amount.

2. A recording apparatus as claimed in claim 1, wherein said moving means includes urging means for urging said storing means toward the second position, a lock mechanism for retaining said storing means in the first position against said urging means, and release means responsive to a signal from said detecting means for releasing said lock mechanism.

3. A recording apparatus as claimed in claim 2, wherein said release means comprises an electromagnetic solenoid.

4. A recording apparatus as claimed in claim 1, wherein said recording material is in form of rolled paper to be cut to a selected length for each recording operation, said storing means having a function to rewind part of the roller paper dispensed prior to movement to the second position.

5. A recording material supply device for supplying a recording material to a recording apparatus which records information on the recording material, comprising:
   a casing;
   a storing unit for storing the recording material therein, said storing unit being detachably provided in said casing;
   detecting means for detecting a quantity of the recording material stored in said storing unit and for outputting a signal when the recording material is exhausted; and
   means responsive to said detecting means for causing said storing unit to protrude from the casing upon lapse of a predetermined time from output of the signal from said detecting means.

6. A recording material supply device for supplying a photosensitive material to a recording apparatus which records information on the photosensitive material, comprising:
   a casing;
   a plurality of storing units for storing the photosensitive material therein, each storing unit being detachably provided in said casing;
   selecting means for selecting storing units to be used from said plurality of storing units;
   supplying means for supplying the photosensitive material from each storing unit to the recording apparatus;
   detecting means for detecting a quantity of the photosensitive material stored in each storing unit;
   control means for controlling said supplying means so that the photosensitive material is supplied from one of the selected storing units until said detecting means detects exhaustion of the photosensitive material stored in said one of the selected storing units, and that the photosensitive material is supplied from another selected storing unit after said detecting means detects exhaustion of the photosensitive material stored in said one of the selected storing units; and means responsive to said detecting means for causing said one of the selected storing units to protrude from the casing upon lapse of a predetermined time after said detecting means detects exhaustion of the photosensitive material stored in said one of the selected storing units.

7. A recording material supply device as claimed in claim 6, wherein said predetermined time corresponds to a period of time till a final photosensitive material is used for recording by the recording apparatus.

8. A recording material supply device as claimed in claim 6, further comprising shutter means disposed between said storing units and said recording apparatus for preventing entry of ambient light, said shutter means being closed after the final photosensitive material has passed therethrough.

9. A recording material supply device as claimed in claim 8, wherein said predetermined time corresponds to a period of time till said shutter means is closed.

10. A recording apparatus comprising:
an apparatus body including a recording station;
storing means for storing a photosensitive material therein, said storing means being movable between a first position for supplying the photosensitive material to said recording station and a second position protruding from said apparatus body;
detecting means for detecting a quantity of the photosensitive material stored in said storing means;
sensor means for detecting that the photosensitive material having been supplied from said storing means reaches a specific position shielded from light; and
means for moving said storing means from the first position to the second position when said sensor means detects the photosensitive sheet having been supplied from said storing means reaches said specific position after said detecting means detects that the quantity of the photosensitive material is less than a predetermined amount.

11. A recording apparatus comprising:
an apparatus body including a recording station;
storing means for storing a photosensitive material therein, said storing means being movable between a first position for supplying the photosensitive material to said recording station and a second position protruding from said apparatus body;
detecting means for detecting a quantity of the photosensitive material stored in said storing means;
shielding means for shielding the photosensitive material having been supplied from said storing means from light; and
means for moving said storing means from the first position to the second position after said shielding means is actuated after said detecting means detects that the quantity of the photosensitive material is less than a predetermined amount.

* * * * *

UNITED STATES PATENT AND TRADEMARK OFFICE
CERTIFICATE OF CORRECTION

PATENT NO. : 5,021,824

DATED : June 4, 1991

INVENTOR(S) : Masato Higashi, et al.

It is certified that error appears in the above-identified patent and that said Letters Patent is hereby corrected as shown below:

In col. 3, line 20, change "for" to --of--.

In col. 4, line 31, change "is position" to --in position--.

In col. 6, line 31, change "followec" to --followed--.

In col. 9, line 36, change "Subjected" to --Subject--.

In col. 9, line 61, after "turned" insert --on--.

Signed and Sealed this

Twenty-ninth Day of September, 1992

Attest:

DOUGLAS B. COMER

Attesting Officer     Acting Commissioner of Patents and Trademarks